United States Patent [19]

Szalvay

[11] Patent Number: 4,713,870
[45] Date of Patent: Dec. 22, 1987

[54] PIPE REPAIR SLEEVE APPARATUS AND METHOD OF REPAIRING A DAMAGED PIPE

[75] Inventor: Laszlo Szalvay, San Carlos, Calif.

[73] Assignee: Raychem Corporation, Menlo Park, Calif.

[21] Appl. No.: 943,832

[22] Filed: Dec. 17, 1986

Related U.S. Application Data

[63] Continuation of Ser. No. 716,265, Mar. 26, 1985, abandoned, which is a continuation-in-part of Ser. No. 596,743, Apr. 4, 1984, abandoned.

[51] Int. Cl.⁴ .............................................. B23P 6/00
[52] U.S. Cl. ................... 29/402.09; 29/447; 29/507; 29/523; 72/370; 138/97
[58] Field of Search ........................ 138/89, 97, 98, 99; 29/234, 235, 447, 523, 530, 401, 401.1, 402.01–402.21, 446, 507; 156/84, 94, 95, 294; 425/383; 264/36, 229, 230, 267, 269; 72/370; 148/402

[56] References Cited

U.S. PATENT DOCUMENTS

| | | |
|---|---|---|
| 646,804 | 4/1900 | Clark . |
| 2,517,626 | 8/1950 | Berg . |
| 2,731,041 | 1/1956 | Mueller et al. . |
| 2,756,779 | 7/1956 | Tratzik et al. . |
| 2,784,273 | 3/1957 | Mueller et al. . |
| 2,829,675 | 4/1958 | Mueller et al. . |
| 3,753,700 | 8/1973 | Harrison et al. . |
| 3,900,939 | 8/1975 | Greacen ........................ 29/447 X |
| 4,069,573 | 1/1978 | Rogers, Jr. et al. . |
| 4,114,654 | 9/1978 | Richardson . |
| 4,149,911 | 4/1979 | Clabburn .......................... 29/446 |
| 4,198,081 | 4/1980 | Harrison et al. ................ 148/402 X |
| 4,294,559 | 10/1981 | Schutzler . |
| 4,296,955 | 10/1981 | Martin . |
| 4,355,664 | 10/1982 | Cook et al. ........................ 138/89 X |
| 4,368,571 | 1/1983 | Cooper, Jr. . |
| 4,410,391 | 10/1983 | Thomas et al. . |
| 4,424,865 | 1/1984 | Payton, Jr. .................... 148/402 X |
| 4,450,616 | 5/1984 | Morita .......................... 148/402 X |
| 4,485,847 | 12/1984 | Wentzell . |
| 4,489,964 | 12/1984 | Kipp et al. . |
| 4,502,896 | 3/1985 | Duerig et al. . |
| 4,505,767 | 3/1985 | Quin . |
| 4,533,411 | 8/1985 | Melton . |
| 4,631,094 | 12/1986 | Simpson et al. ............... 148/11.5 F |
| 4,667,535 | 5/1987 | Simpson et al. . |

FOREIGN PATENT DOCUMENTS 1177884 9/1964 Fed. Rep. of Germany ........ 29/446
2514099 4/1983 France .

Primary Examiner—Howard N. Goldberg
Assistant Examiner—Joseph M. Gorski
Attorney, Agent, or Firm—T. Gene Dillahunty; Ira D. Blecker

[57] ABSTRACT

Disclosed is a pipe repair sleeve apparatus. There is a draw means having expanding means on either end of the draw means. There is also an annular repair sleeve. The draw means is contained within the sleeve with at least a portion of each of the expanding means protruding outside of the sleeve. Then, the repair sleeve assembly is inserted within the damaged pipe. The draw means urges the expanding means toward one another and inwardly of the sleeve so that opposed ends of the sleeve are expanded outwardly into engagement with an inside diameter of the damaged pipe. Preferably, the draw means is made from a material which is a shape memory alloy. Also disclosed is a method of repairing a damaged pipe. This method specifies the steps necessary for installing the pipe repair sleeve apparatus.

23 Claims, 10 Drawing Figures

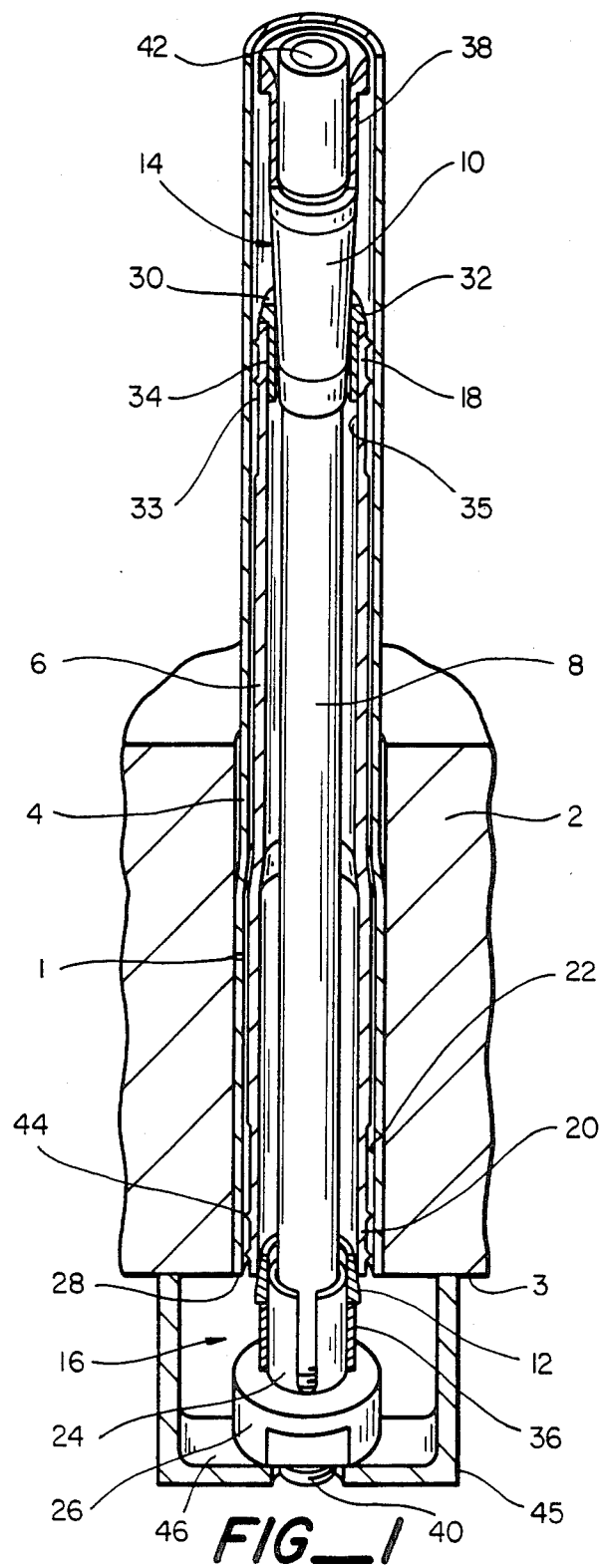
FIG_1

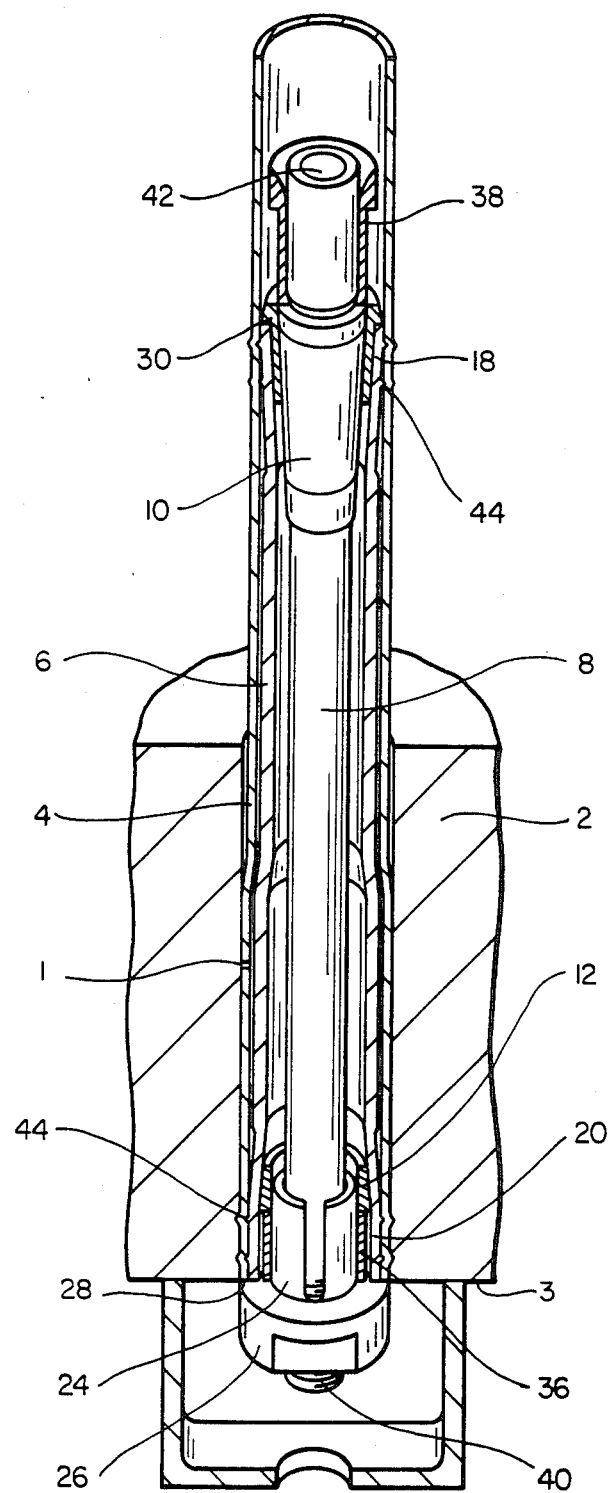
FIG_2

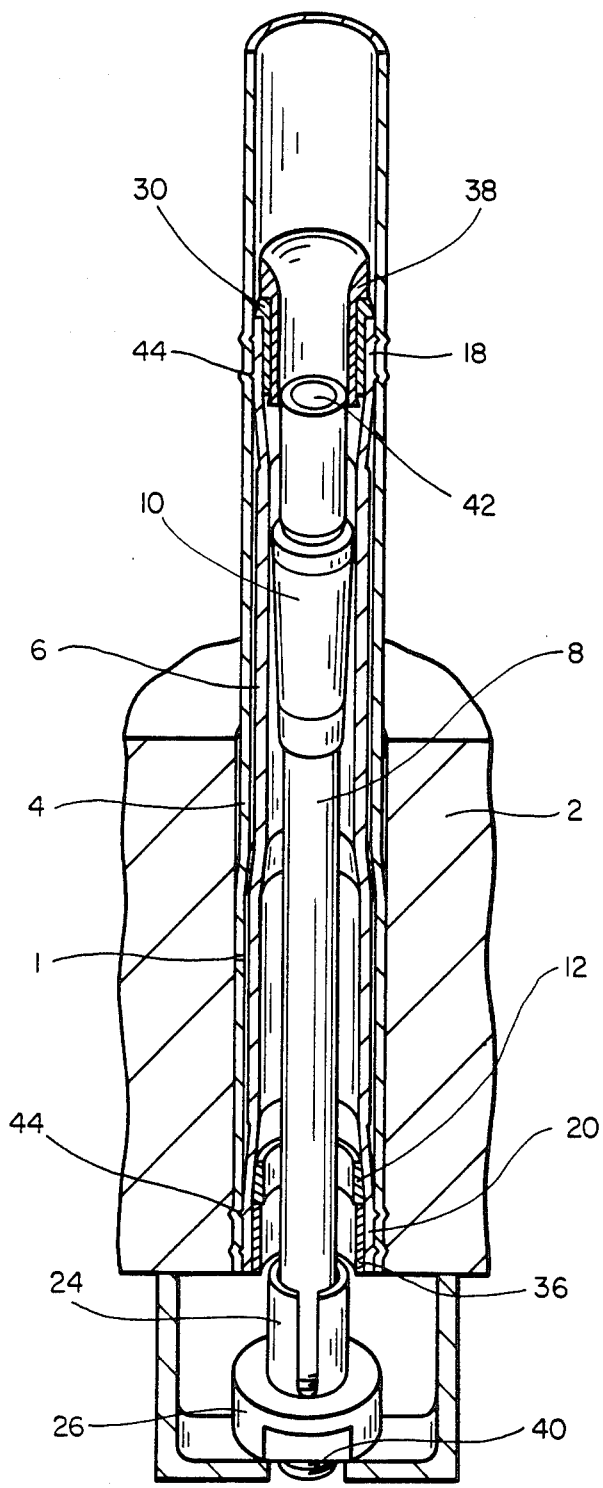
FIG_3

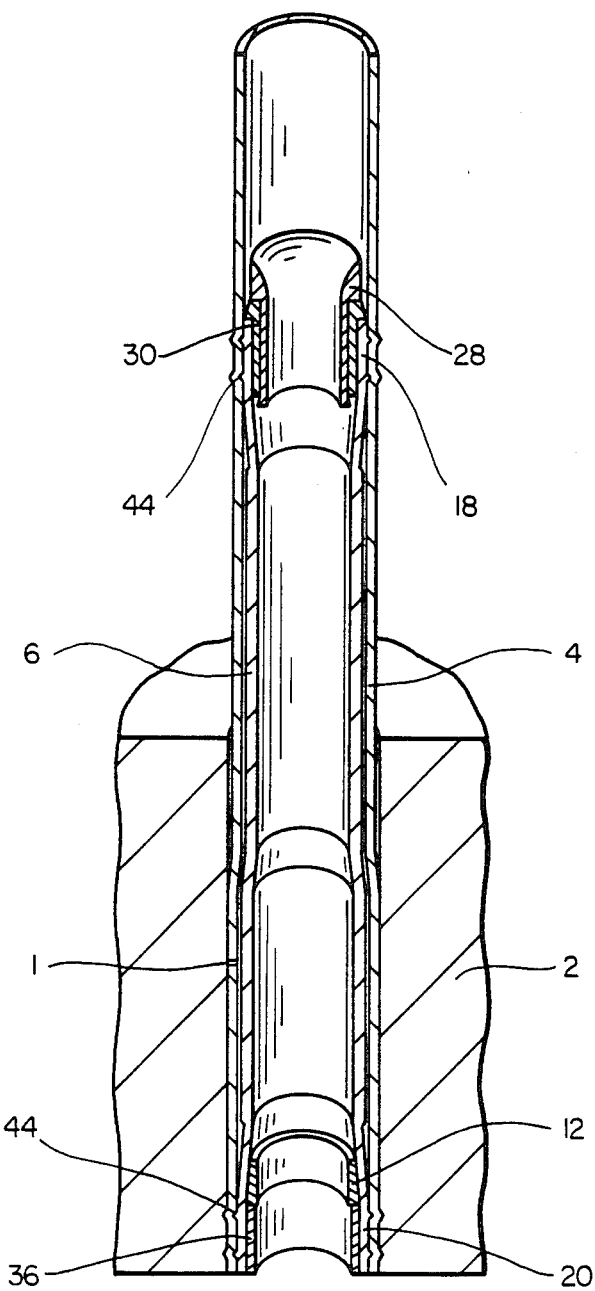
FIG_4

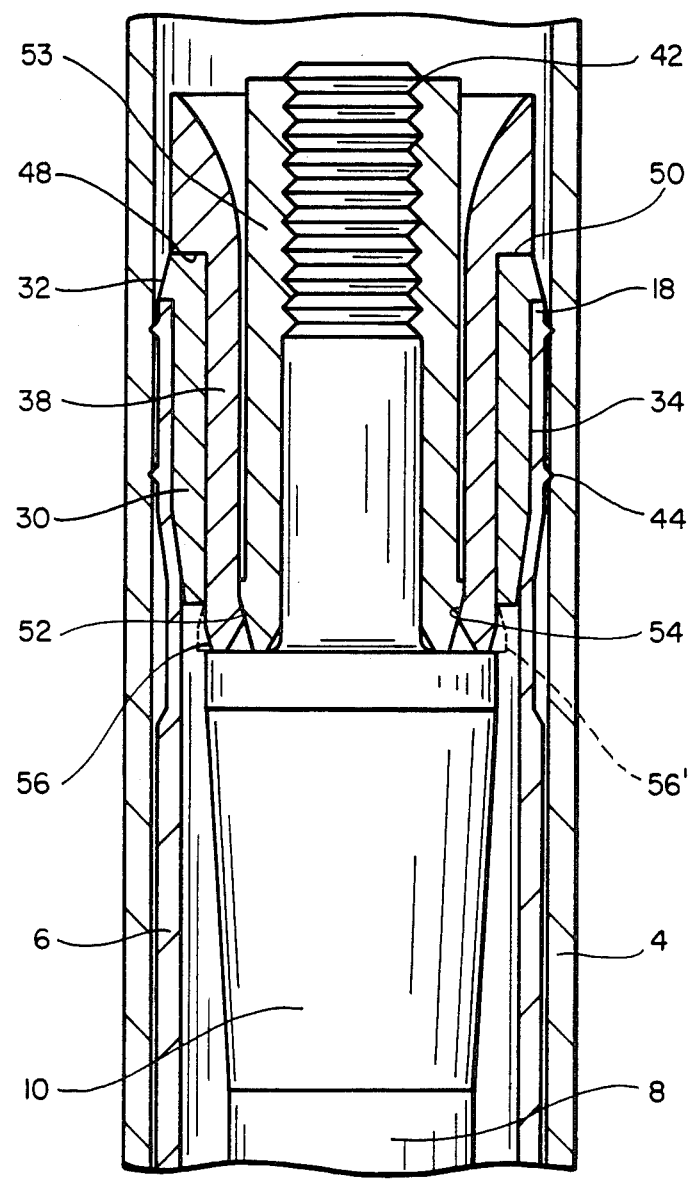
FIG_5

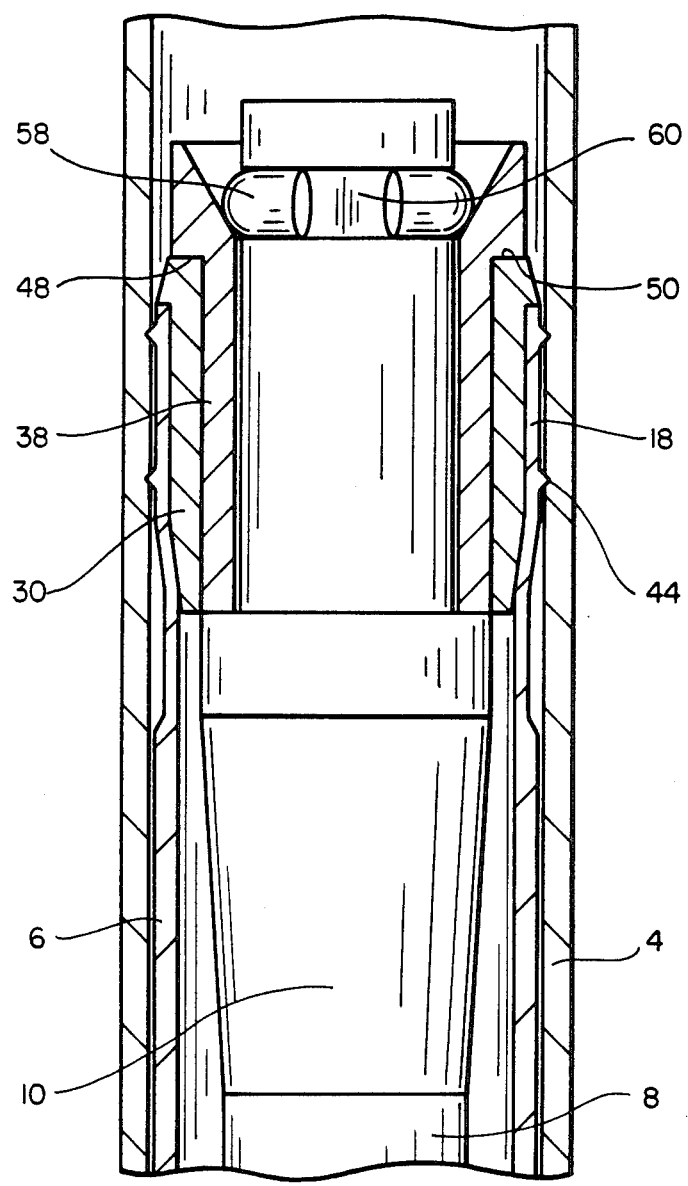
FIG_6

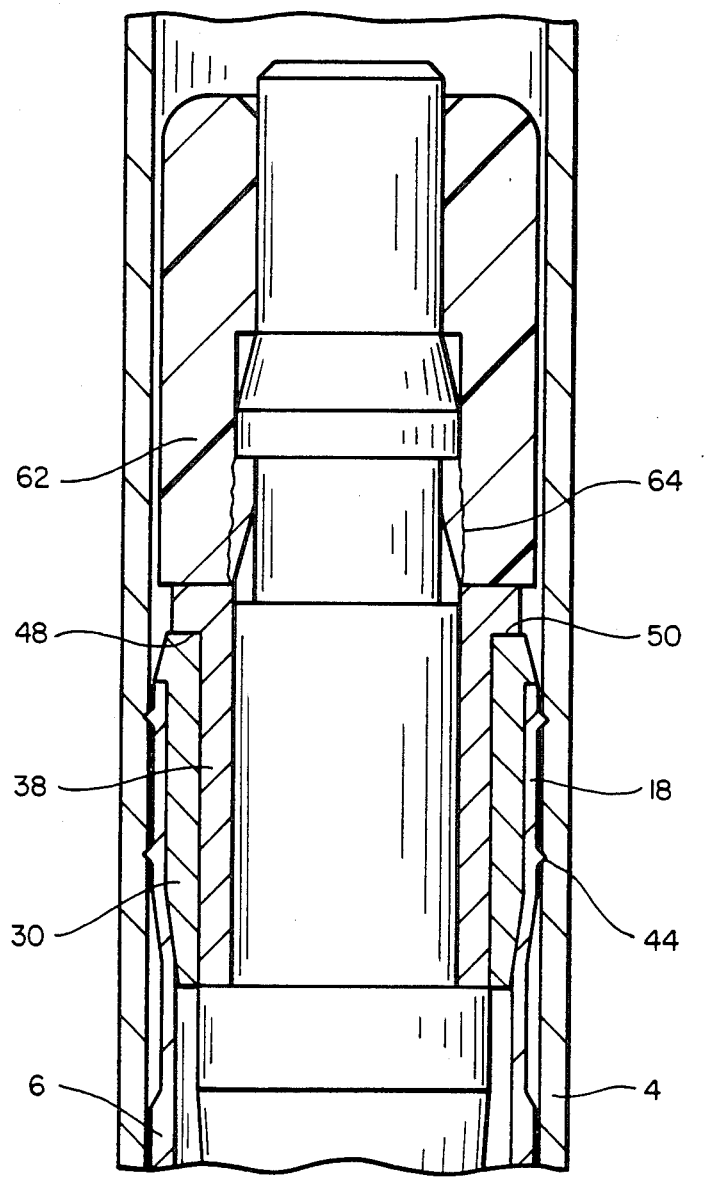
FIG_7

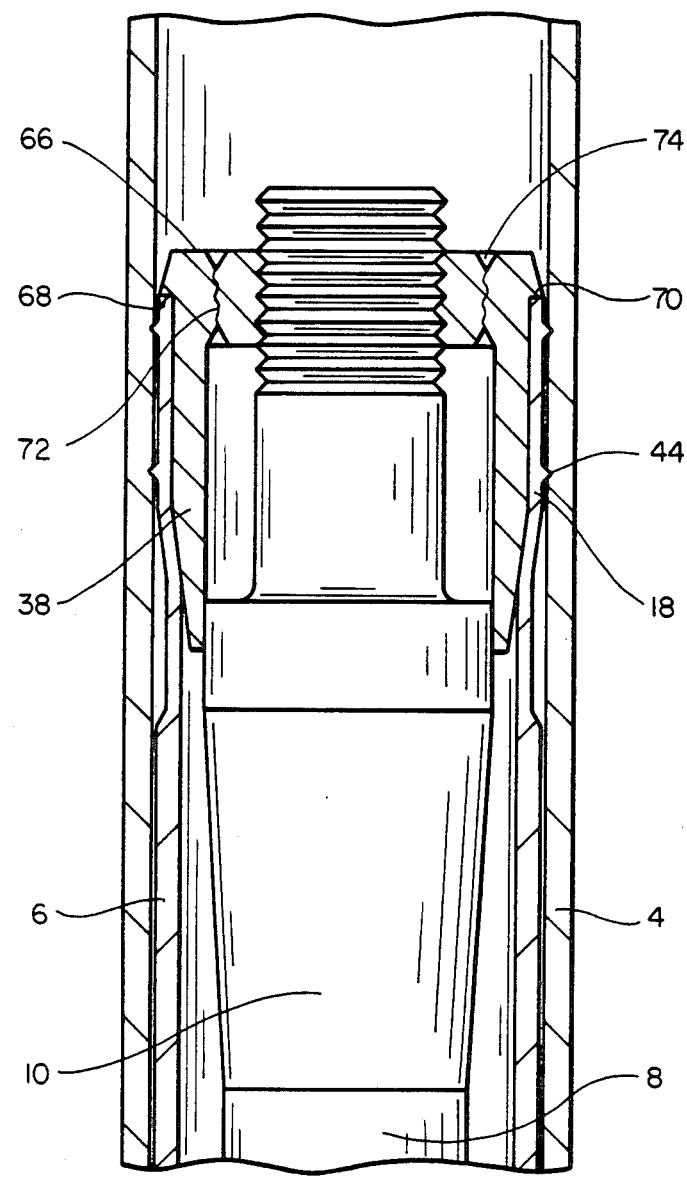
FIG_8

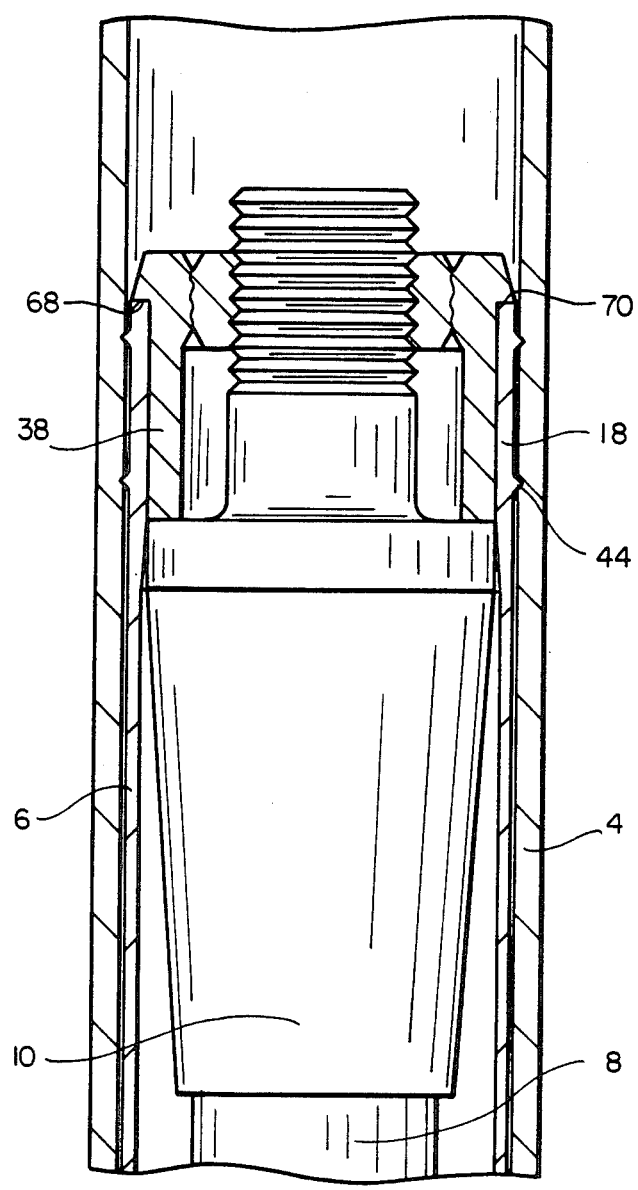
FIG_9

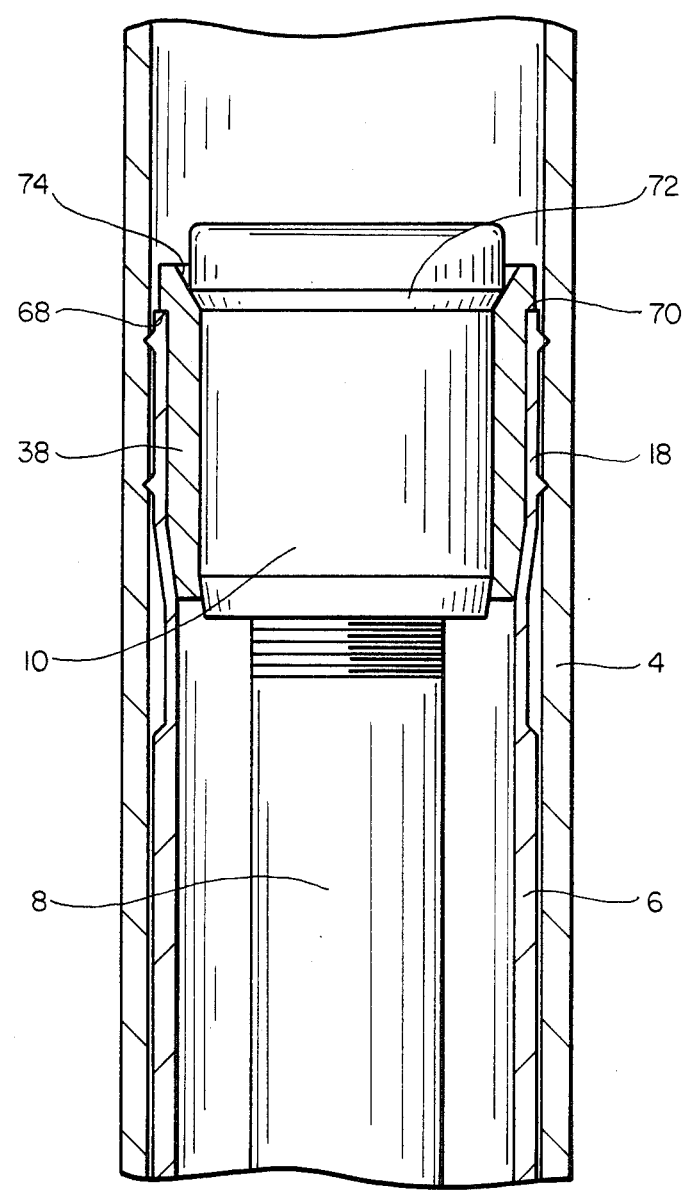
FIG_10

PIPE REPAIR SLEEVE APPARATUS AND METHOD OF REPAIRING A DAMAGED PIPE

RELATED APPLICATION

This application is a continuation of application Ser. No. 716,265, filed Mar. 26, 1985 now abandoned, which is a continuation-in-part of copending application Ser. No. 596,743, filed Apr. 4, 1984, entitled, "Pipe Repair Sleeve Apparatus and Method of Repairing a Damaged Pipe," now abandoned.

BACKGROUND OF THE INVENTION

This invention relates generally to the repair of fluid carrying tubes such as those carrying natural gas, water or steam. More particularly, this invention has application to the repair of a steam generator.

Steam generators are an integral part of a power generating station. Over a period of time, the steam generator, or any fluid carrying tube for that matter, may develop leaks due to the combined corrosive effects of the fluid medium and the environment in which the steam generator or fluid carrying tube is situated. Whenever a leak is found, it must be stopped in some manner. One method is to plug the damaged tube. This method, of course, leads to reduced operating capacity. When enough damaged tubes become plugged, the power station must be shut down for retubing of the steam generator. Due to the time and expense involved, it would be desirable to avoid shutdown for as long as possible.

An alternative method is the repair in situ of the damaged tube. If the tube is repaired rather than plugged, operating capacity is not substantially reduced. A common embodiment of this alternative method is the insertion of a repair sleeve adjacent to the leak in the damaged pipe. When the repair sleeve is placed in position, it is desirable that it be firmly retained there. This is desirable for two reasons. The first is that any dislodgement of the repair sleeve would be totally unacceptable from the standpoint of the operation of the steam generator. The second is that firm retention promotes a leak-tight fit.

It is also desirable that the repair sleeve apparatus be capable of being deployed quickly and efficiently so as to avoid expensive labor costs. It is most desirable that the repair sleeve operation be subject to automation as by a remote manipulator.

Solutions as heretofore proposed in the prior art have failed to achieve these aims.

In U.S. Pat. No. 1,471,184 to Miles, one method of inserting and retaining a repair sleeve is illustrated. Miles shows expanders in either end of the sleeve which are simultaneously drawn together by a mechanical apparatus including a draw member. Packers are compressed between the sleeve and the expanders to provide sealing. The draw member is operated by turning a wing nut which can be tedious and time consuming. Removal of the draw member can also be burdensome.

In the U.S. Pat. No. 4,069,573 to Rogers, Jr. et al, the repair sleeve and damaged tube are plastically deformed by an hydraulic apparatus. According to the disclosure, an interference fit results between the repair sleeve and joint but due to their essentially equivalent elastic constants, a slight mechanical clearance, i.e., leakage, may exist. This is an unsatisfactory situation for two reasons. The first is that this apparatus is not suitable for situations where a leak proof fit is necessary. The second is that mechanical deformation of the damaged tube is undesirable and is even more undesirable when the damaged tube is constrained within a tube sheet.

In U.S. Pat. No. 2,756,779 to Tratzik et al an expanding mandrel is utilized to expand deformable ferrules on either end of the repair sleeve. This apparatus is unsatisfactory because of the time and manpower necessary to secure the repair sleeve. The distal end of the repair sleeve is expanded first and then the whole apparatus must be reset before expanding the near end of the repair sleeve. Such a procedure is expensive in operation and is impractical when repairing a large number of tubes. It is also possible that due to the elastic component of the ferrule springing back, a leak tight seal may not be achieved. Other similar unwieldy mechanical arrangements are described in U.S. Pat.. Nos. 2,731,041, 2,784,627, and 2,829,675, all to Mueller et al.

Mechanical arrangements where two expanding mandrels are drawn toward one another are shown in U.S. Pat. Nos. 2,517,626 to Berg and 4,114,654 to Richardson. Both of these arrangements would be unsatisfactory for use in securing repair sleeves since all of the individual components remain in the damaged tube, thereby severely restricting the fluid flow to an untolerable level.

In conjunction with the aim to automate the sleeve repair operation, it would be desirable to deploy the sleeve repair apparatus with as little manipulation as possible.

Materials capable of possessing shape memory are well known. An article made of such materials can be deformed from an original, heat-stable configuration to a second, heat-unstable configuration. The article is said to have shape memory for the reason that, upon the application of heat alone, it can be caused to revert, or to attempt to revert, from its heat-unstable configuration to its original, heat-stable configuration, i.e. it "remembers" its original shape.

Among metallic alloys, the ability to possess shape memory is a result of the fact that the alloy undergoes a reversible transformation from an austenitic state to a martensitic state with a change in temperature. This transformation is sometimes referred to as a thermoelastic martensitic transformation. An article made from such an alloy, for example a hollow sleeve, is easily deformed from its original configuration to a new configuration when cooled below the temperature at which the alloy is transformed from the austenitic state to the martensitic state. The temperature at which this transformation begins is usually referred to as $M_s$ and the temperature at which it finishes $M_f$. When an article thus deformed is warmed to the temperature at which the alloy starts to revert back to austenite, referred to as $A_s$ ($A_f$ being the temperature at which the reversion is complete) the deformed object will begin to return to its original configuration.

Thus, in a sense, shape memory alloys can be self-actuating when exposed to a change in temperature. When these shape memory alloys promote the movement of a cooperating part, they become self-actuating drivers.

The use of shape memory alloys as self-actuating drivers has heretofore been limited to devices such as a coupling, (U.S. Pat. No. 4,149,911 to Clabburn), a steam generator tube plug (U.S. Pat. No. 3,900,939 to Greacen) and a prestressed structural joint member (U.S. Pat. No. 4,294,559 to Schutzler). As far as applicant is aware, no article has been disclosed in which the shape memory effect is utilized to axially contract a longitudinally dimensioned draw means.

In view of the above, it is an object of the invention that a repair sleeve be securely retained within a fluid carrying tube without leakage.

It is another object of the invention that the repair sleeve apparatus be capable of being deployed quickly and efficiently so as to avoid expensive labor costs.

It is a further object of the invention that the method of deploying the repair sleeve apparatus incorporate the concept of self-actuation.

These and other objects of the invention will become apparent by reference to the following description taken in conjunction with the accompanying drawings.

BRIEF SUMMARY OF THE INVENTION

Disclosed according to the invention is an apparatus for securing a repair sleeve within a damaged pipe. The apparatus comprises a draw means having expanding means on either end of the draw means. The draw means is contained within the sleeve with at least a portion of each of the expanding means protruding outside of the sleeve. In a first embodiment of the apparatus, the draw means comprises a shape-memory alloy and the draw means urges, without the application of external mechanical means, the expanding means toward one another and inwardly of the sleeve. In so doing, the opposed ends of the sleeve are expanded outwardly into engagement with an inside diameter of the damaged pipe.

In a second embodiment of the apparatus, the draw means urges the expanding means toward one another and inwardly of the sleeve so that opposed ends of the sleeve are expanded outwardly into engagement with an inside diameter of the damaged pipe. In this embodiment, however, opposed ends of the sleeve, one end first and then the other end in sequence, are expanded into engagement with the damaged pipe. It is not necessary to this embodiment that the draw means comprise a shape memory alloy.

In a third embodiment of the apparatus, the apparatus further comprises two retention means peripherally located with respect to the draw means and distally located with respect to the expanding means. In this embodiment, the draw means, which does not necessarily comprise a shape-memory alloy, urges the retention means and expanding means, respectively, toward each other and inwardly of the sleeve. Opposed ends of the sleeve are then expanded outwardly into engagement with an inside diameter of the damaged pipe. The retention means are subsequently expanded outwardly into engagement with the now-expanded ends of the sleeve.

Also disclosed according to the invention is a repair sleeve assembly for repairing a damaged pipe. The repair sleve assembly comprises a draw means having expanding means on either end and an annular repair sleeve. The draw means is contained within the sleeve with at least a portion of each of the expanding means protruding outside of the sleeve. The repair sleeve assembly is then inserted within the damaged pipe. In a first embodiment of the repair sleeve assembly, the draw means comprises a shape-memory alloy. The draw means then urges, without the application of external mechanical means, the expanding means toward one another and inwardly of the sleeve. The opposed ends of the sleeve are then expanded outwardly into engagement with an inside diameter of the damaged pipe.

In a second embodiment of the repair sleeve assembly, the draw means, which is not necessarily a shape-memory alloy, urges the expanding means toward one another and inwardly of the sleeve. The opposed ends of the sleeve, one end first and then the other end in sequence, are expanded outwardly into engagement with an inside diameter of the damaged pipe.

In a third embodiment of the repair sleeve assembly, the assembly further comprises two retention means peripherally located with respect to the draw means and distally located with respect to the expanding means. The draw means urges the retention means and the expanding means respectively toward one another and inwardly of the sleeve. What follows is that firstly, opposed ends of the sleeve are expanded outwardly into engagement with the inside diameter of the damaged pipe. Secondly, the retention means are expanded outwardly into engagement with the now-expanded ends of the sleeve. It is not necessary in this embodiment that the draw means comprise a shape-memory alloy.

Also disclosed according to the invention is a method of repairing a damaged pipe. The method may utilize any of the heretofore mentioned embodiments of the repair apparatus assembly in accomplishing the method.

As will become more apparent hereinafter, the above-described apparatus, assembly and method achieve the various objects of the invention and incidentally also solve the problems of the prior art by the installation of a leak-tight sleeve in a quick and efficient way that is subject to automation.

BRIEF DESCRIPTION OF THE DRAWINGS

FIG. 1 is a view, partly in section, of the invention about to be deployed.

FIG. 2 is a view, partly in section, of the invention partly deployed.

FIG. 3 is a view, partly in section, of the invention fully deployed.

FIG. 4 is a view of the invention, partly in section, fully deployed with the draw means removed.

FIG. 5 is an enlarged view of the top of the draw means showing the retention means in greater detail.

FIG. 6 is a view similar to FIG. 5 but showing another embodiment of the retention means.

FIG. 7 is a further view similar to FIG. 5 but showing another embodiment of the retention means.

FIG. 8 is a further view similar to FIG. 5 but showing still another embodiment of the retention means.

FIG. 9 is a still further view similar to FIG. 5 but showing still another embodiment of the retention means.

FIG. 10 is yet another view similar to FIG. 5 but showing another embodiment of the retention means.

DETAILED DESCRIPTION OF THE INVENTION

Referring now to the figures in more detail and particularly referring to FIGS. 1 to 4, the invention is shown in a typical working environment. A damaged pipe 4 having some form of damage such as a hole 1 is shown terminating in a tube sheet 2. In this working environment, the damaged pipe is usually accessible only through the bottom 3 of the tube sheet 2. Thus, whatever apparatus and method may be employed to repair a damaged pipe, it is only possible to work from one end. With this in mind, the invention will now be described in more detail.

Disclosed according to the invention is an apparatus for securing a repair sleeve 6 within a damaged pipe 4. In a first embodiment of the apparatus, the apparatus comprises a shape-memory alloy draw means 8 having expanding means 10, 12 on either end. The draw means 8 is contained within the sleeve 6 with at least a portion 14, 16 of each of the expanding means protruding outside of the sleeve. The draw means urges, without the application of external mechanical means, the expanding means toward one another and inwardly of the sleeve. In so doing, opposed ends 18, 20 of the sleeve are expanded outwardly into engagement with an inside diameter 22 of the damaged pipe. Without the application of external mechanical means is understood to mean the absence of mechanical arrangements for converging the expanding means such as the threaded draw member and wing nut of the aforementioned Miles patent.

As shown in the figures, the expanding means may comprise conically shaped mandrels although other shapes are contemplated within the scope of the invention. One of the mandrels is integral with the draw means and the other of the mandrels is a collapsible mandrel peripherally located with respect to the draw means. The term "integral" is interpreted to mean that the mandrel is somehow attached directly to the draw means such as by a threaded connection.

The collapsible mandrel is actually slightly stronger than the sleeve. This must be so in order to expand the sleeve. However, when a sufficient force is exerted against the collapsible mandrel, such as when further expansion of the sleeve is resisted by the tube sheet, the collapsible mandrel will collapse or become deformed. At this point, the mission of the collapsible mandrel, i.e., expansion of the sleeve, has been completed and damage to the tube sheet is avoided.

Shown inside of the collapsible mandrel is a spacer 24. The purpose of the spacer is to provide support for the collapsible mandrel.

The urging of the expanding means toward one another occurs by the contraction of the draw means in response to a transformation of the shape-memory alloy from the martensitic to the austenitic state. That is, the draw means of the invention in the martensitic state has a longer length than in the austenitic state so that upon warming the alloy through the transformation temperature, the alloy will achieve the austenitic state along with a decrease (contraction) in length associated with this state. The transformation of shape memory alloys is a well-known concept especially known to those skilled in the art. In one preferred embodiment of the invention, the transformation of the shape memory alloys utilized in the instant invention has been chosen to occur at ambient temperature. In this way, the transformation will occur solely in response to the temperature of the working environment so that the expansion of the sleeve will be self-actuated. That is, expansion of the sleeve will automatically occur after installation of the apparatus so that manual labor is unnecessary.

The draw means has an enlarged cross-sectional portion 26 proximate to one of the expanding means, in this case it is expanding means 12, such that portion 26 abuts an end 28 of the damaged pipe (or some other abutment surface which may even be the bottom of the tube sheet itself) during the urging of the expanding means toward one another. This is clearly shown in FIG. 2. The abutment of the enlarged cross sectional portion against an end of the damaged pipe assists in the operation of the invention as will be explained hereafter.

The apparatus further comprises a ferrule 30 peripherally located with respect to one of the expanding means, either 10 or 12. For purposes of the illustration, the ferrule is peripherally located with respect to expanding means 10. That is, the ferrule generally surrounds the expanding means 10. The ferrule has a stepped outside diameter configuration. As shown in the figures, the ferrule has a larger outside diameter 32 and a smaller outside diameter 34. The larger outside diameter 32 of the ferrule will generally conform to the outside diameter 33 of the sleeve, and the smaller outside diameter 34 of the ferrule will generally conform to the inside diameter 35 of the sleeve. Because of this stepped outside diameter configuration, the ferrule is suitable for nesting with the sleeve so that upon the urging of the expanding means toward one another, the ferrule will nest with an end of the sleeve and then expand outwardly in conjunction with the expansion of the sleeve.

It is preferable that the apparatus further comprise two retention means 36, 38. These retention means are peripherally located with respect to the draw means 8 and distally located with respect to the expanding means 10, 12. In other words, retaining means 36 will be closer to the end 40 of the draw means than will the expanding means 12. Similarly, the retaining means 38 will be closer to the end 42 of the draw means than will the expanding means 10. Due to the contraction of the draw means, the retention means will be drawn toward one another and inwardly of the sleeve. However, the retention means will not enter the sleeve until the sleeve has been expanded by the expanding means. After the expansion of the sleeve, the retention means will be expanded outwardly, as explained hereafter, into engagement with the now-expanded ends of the sleeve. This is clearly shown in FIGS. 3 and 4.

In a second embodiment of the apparatus, the apparatus comprises a draw means 8 having expanding means 10 and 12 on either end of the draw means. The apparatus further comprises two retention means 36, 38 peripherally located with respect to the draw means and distally located with respect to the expanding means 10, 12. As can be seen from FIGS. 1 and 2, the retention means generally surround the draw means and are located closer to the ends of the draw means than are the expanding means.

The draw means are contained within the sleeve 6 with the retention means 36, 38 and at least a portion 14, 16 of each of the expanding means protruding outside of the sleeve. The draw means urges one of the retention means and one of the expanding means toward the others of the retention means and the expanding means and also inwardly of the sleeve. What follows is that firstly, as the expanding means proceed inwardly of the sleeve, opposed ends 18, 20 of the sleeve are expanded outwardly into engagement with an inside diameter 22 of the damaged pipe. Secondly, after the retention means enter the sleeve, the retention means are then expanded outwardly into engagement with the now-expanded ends of the sleeve. The expansion of the retention means is explained below.

By expanding the retention means after the expansion of the sleeve, the retention means serve to keep the expanded ends of the sleeve in the fully expanded position. Thus, the elastic spring-back of the sleeve is prevented, which then leads to a leak-tight seal. The long-standing problem of achieving a leak-tight seal, a problem heretofore recognized in the prior art, has accordingly been solved.

The expanding means may comprise conically-shaped mandrels although there are other shapes which are contemplated within the scope of the invention. As described earlier in conjunction with the previous embodiment of the apparatus, one of the mandrels is integral with the draw means and the other of the mandrels is a collapsible mandrel.

The draw means may comprise a shape-memory alloy. If this is the case, then the urging of the respective retention means and expanding means toward one another occurs by the contraction of the draw means in response to a transformation of the shape-memory alloy from the martensitic state to the austenitic state. Such a transformation of a shape-memory alloy is well known to those skilled in the art. In one preferred embodiment of the invention, the transformation is chosen so as to occur at ambient temperature, that is, the temperature of the working environment. In this case, the expansion of the sleeve will be self-actuated.

It is preferable that the draw means have an enlarged cross-sectional portion 26 proximate to one of the expanding means such that the portion 26 abuts an end 28 of the damaged pipe during the urging of the respective means and expanding means toward one another. Thus, when the invention is partly deployed as shown in FIG. 2, the enlarged cross-sectional portion 26 will abut the end 28 of the damaged pipe.

It is also preferable that the apparatus comprise a ferrule 30 peripherally located with respect to one of the expanding means. As shown in FIGS. 1 and 2, the ferrule is peripherally located with respect to expanding means 10. The ferrule has a stepped outside diameter configuration as explained earlier so that upon the urging of the respective retention means and expanding means toward one another the ferrule nests with an end of the sleeve. Since the ferrule is centrally located with respect to the expanding means, the ferrule nests with the sleeve prior to the expansion of the sleeve. It follows that the ferrule will be expanded outwardly in conjunction with the expansion of the sleeve. After the expansion of the ferrule and the sleeve, one of the retention means then expands outwardly into engagement with the now-expanded ferrule.

In one preferred embodiment of the invention, at least one of the retention means 36 or 38 comprises a shape-memory alloy with a transformation from the martensitic state to the austenitic state occurring at ambient temperature. With this preferment of the invention, the retention means will automatically expand outwardly upon exposure to ambient temperature so as to retain the ferrule and sleeve in their expanded position. Since this step is automatic, little manpower need be expended. The retention means which comprises a shape-memory alloy will, most preferably, be the top retention means 38.

The collapsible mandrel 12 and the retention means 36 may be made of a single piece so that both the retention means and the mandrel will be collapsible. With both the collapsible mandrel and the retention means 36 being collapsible, their elastic component will tend to exert a force outwardly. This elastic force will counteract the springback of the expanded sleeve and, therefore, hold the expanded sleeve in its expanded position. It is not essential to the invention that the colapsible mandrel and retention means 36 be made from a shape memory alloy. Other alloys such as stainless steel will achieve the objects of the invention. In fact, if rentention means 38 were not made from a shape memory alloy (although it is preferred that it be made from shape memory alloy), it could also be made from another alloy such as stainless steel.

In a third embodiment of the apparatus, the apparatus comprises a draw means 8 and expanding means 10, 12 on either end of the draw means. The draw means are contained within the sleeve 6 with at least a portion 14, 16 of each of the expanding means protruding outside of the sleeve. The draw means urges the expanding means toward one another and inwardly of the sleeve. It is not necessary that the draw means be a shape-memory alloy and, in fact, other mechanical expedients will suffice in this embodiment.

When the draw means urges the expanding means toward one another, opposed ends of the sleeve, one end first and then the other end, are expanded outwardly into engagement with an inside diameter 22 of the damaged pipe. In the most preferred embodiment of the invention, end 20 of the sleeve will be expanded fully outwardly and then end 18 of the sleeve will be expanded fully outwardly.

The expanding means may comprise conically-shaped mandrels or other shapes which are contemplated within the scope of the invention. One of the mandrels 10 is integral with the draw means 8 and the other of the mandrels 12 is a collapsible mandrel peripherally located with respect to the draw means.

In a preferment of this embodiment, the draw means comprises a shape-memory alloy. Then, the urging of the expanding means toward one another occurs by the contraction of the draw means in response to a transformation of the shape-memory alloy from the martensitic state to the austenitic state. Such a transformation is well known to those skilled in the art. The transformation in this one preferred embodiment occurs at ambient temperatures. In this way, the expansion of the sleeve will be self-actuated.

The draw means has an enlarged cross-sectional portion 26 proximate to one of the expanding means, as shown in the figures it is expanding means 12, such that the enlarged portion 26 abuts an end 28 of the damaged pipe during the urging of the expanding means toward one another. This is shown most clearly in FIG. 2.

The apparatus preferably comprises a ferrule 30 peripherally located with respect to one of the expanding means, preferably expanding means 10. The ferrule has a stepped outside diameter configuration so that upon the urging of the expanding means toward one another, the ferrule nests with an end, preferably end 18, of the sleeve. When the ferrule nests in this manner, the ferrule will then be expanded outwardly in conjunction with the expansion of the sleeve.

It is most preferred that the apparatus further comprise two retention means 36, 38. The retention means are peripherally located with respect to the draw means and distally located with respect to the expanding means. One 36 of the retention means is expanded outwardly into engagement with an expanded end 20 of the sleeve, and the other 38 of the retention means is expanded outwardly into engagement with the expanded ferrule 30. By virtue of the retention means, a leak-tight seal is invariably obtained.

According to the invention, a repair sleeve assembly for repairing a damaged pipe is disclosed. In a first embodiment, the repair sleeve assembly comprises a shape-memory alloy draw means 8 having expanding means 10, 12 on either end and an annular repair sleeve 6. The draw means 8 is contained within the sleeve 6 with at least a portion 14, 16 of each of the expanding means protruding outside of the sleeve. The repair sleeve assembly is then inserted within the damaged pipe 4. The draw means urges, without the application of external mechanical means, the expanding means 10, 12 toward one another and inwardly of the sleeve 6. When the expanding means are urged toward one another and proceed inwardly of the sleeve, opposed ends 18,20 of the sleeve are expanded outwardly into engagement with an inside diameter 22 of the damaged pipe.

It is preferred that the sleeve has seal means proximate to at least one end of the sleeve. As shown in the figures, the seal means may comprise circumferentially extending teeth 44. It is conceivable, within the scope of the invention, that the seal means may also comprise soft metal seals, braze material, or other chemical or mechanical expedients.

In a second embodiment of the repair sleeve assembly the assembly comprises a draw means 8 having an expanding means 10, 12 on either end 42, 40 respectively. The assembly further comprises two retention means 36, 38 peripherally located with respect to the draw means and distally located with respect with the expanding means. Finally the repair sleeve assembly comprises an annular repair sleeve 6. The draw means is contained within the sleeve with the retention means 36, 38 and at least a portion 14, 16 of each of the expanding means protruding outside of the sleeve. The repair sleeve assembly is then inserted within the damaged pipe. The draw means urges the retention means and the expanding means, respectively toward one another and inwardly of the sleeve. By virtue of this action firstly, the opposed ends 18, 20 of the sleeve are expanded outwardly into engagement with the inside diameter 22 of the damaged pipe. Secondly, the retention means enter the sleeve and are then expanded outwardly into engagement with the already expanded ends 20, 18 of the sleeve. It is not necessary to this embodiment of the invention that the draw means comprise a shape memory alloy. In fact, it is contemplated within the scope of the invention that the draw means in this embodiment may be a draw rod or pull rod or any other mechanical or hydraulic expendient which may be known from the prior art.

The sleeve has seal means proximate to at least one end of the sleeve. The seal means may comprise circumferentially extending teeth. Other preferments of the seal means comprise a soft metal seal or braze material. Other chemical or mechanical expedients may also comprise the seal means.

A third embodiment of the repair sleeve assembly is disclosed. This assembly comprises a draw means 8 and expanding means 10, 12 on either end of the draw means. There is also disclosed an annular repair sleeve 6 as part of the assembly. The draw means is contained within the sleeve with at least a portion 14, 16 of each of the expanding means protruding outside of the sleeve. The repair sleeve assembly is then inserted into the damaged pipe. The draw means urges the expanding means toward one another and inwardly of the sleeve. This, of course, leads to the expansion of the ends of the sleeve. In this embodiment of the invention, however, opposed ends of the sleeve, one end first and then the other in sequence are expanded outwardly into engagement with an inside diameter 22 of the damaged pipe. As will be explained in more detail hereafter, end 20 of the sleeve will be expanded first and when that end is fully expanded then end 18 of the sleeve will be fully expanded.

It is preferable that the sleeve have seal means proximate to at least one end of the sleeve. The seal means may comprise circumferentially extending teeth 44 as shown in the figures. Other types of seal means may also be contemplated within the scope of the invention. These other seal means may be soft metal seals, braze material, or other chemical or mechanical expedients.

Features of the various embodiments of the repair sleeve assembly which have not been described here are, nevertheless, included within the scope of the invention. Many of these features have been described in conjunction with the various embodiments of the apparatus for securing a repair sleeve. Other features of the repair sleeve assembly are clearly shown in the drawings or can be fairly implied from the aforementioned detailed description of the invention. The remaining features will become apparent herefter.

The functioning of the invention will now be described in greater detail. Disclosed according to the invention is a repair sleeve assembly for repairing a damaged pipe. In a first embodiment, the assembly comprises a shape memory alloy draw means 8 having a conically shaped mandrel 10 at one end 42 and an opposed end 40. There is also a collapsible conically shaped mandrel 12 and an annular repair sleeve 6. The repair assembly in a first position will have the collapsible mandrel 12 peripherally located with respect to the draw means 8 and, at the same time, the collapsible mandrel will be proximate to the opposed end 40 of the draw means.

In a second position, the repair sleeve assembly will have the draw means contained within the sleeve with at least a portion of each of the mandrels, as shown by 14 and 16 of FIG. 1 of the drawings protruding outside of the sleeve.

In a third position, as also shown by FIG. 1, the repair sleeve assembly is inserted within the damaged pipe 4 with at least a portion of the collapsible mandrel 12 remaining outside the damaged pipe.

In a fourth position, as most clearly shown by FIG. 2, the repair sleeve assembly will have the collapsible mandrel 12 converged toward the draw means mandrel 10 without the application of external mechanical means. "Without the application of external mechanical means" should be understood to mean that the draw means mandrel will converge toward the collapsible mandrel without the necessity of mechanical (including hydraulic) force being applied to the assembly by some means outside the assembly. Necessarily, the mandrels are urged inwardly of the sleeve while simultaneously expanding opposed ends of the sleeve outwardly into engagement with the damaged pipe. In this position, the invention is partly deployed.

In the fifth position, the repair sleeve assembly has the draw means disengaged from the assembly. FIG. 3 shows the assembly fully deployed with the draw means withdrawing from the assembly. The draw means is now completely past the most inward end 18 of the sleeve which has just been expanded. FIG. 4 shows the repair sleeve assembly fully deployed with the draw means completely disengaged from the assembly. The assembly is sized so that once the draw means mandrel has expanded the most inward end 18 of the sleeve, it will be able to pass the near end 20 of the already expanded sleeve without difficulty.

As described earlier, the draw means has an enlarged cross-sectional portion 26 adjacent to and distally of the collapsible mandrel such that the enlarged portion 26 abuts an end 28 of the damaged pipe during the convergence of the mandrels. The importance of this enlarged cross-sectional portion is that it acts as an anchor to prevent relative movement of the draw means further into the damaged pipe. Since the draw means will be anchored at one end the only way that the draw means can now move is to contract back toward the enlarged portion. This will guarantee that two things will happen. The first is that both mandrels will proceed inwardly of the sleeve so as to fully expand the sleeve. The second is that the innermost mandrel draw means mandrel 10, will not be left outside of the sleeve or become wedged in the sleeve, which would cause the assembly to effectively plug up rather than repair the damaged pipe.

As noted in the drawings, FIGS. 1 to 3, there is also fixture 45 which is either magnetically or mastically attached to the bottom 3 of the tube sheet 2. The purpose of this fixture is to properly locate the repair sleeve assembly with respect to the damaged pipe. As shown in FIG. 1, the enlarged cross-sectional portion 26 rests on surface 46 of the fixture 45. When the fixture 45 is properly dimensioned, the sleeve, draw means and expanding means, as well as the other elements of the invention, will all be in the correct position prior to actuation of the draw means. Once the repair sleeve assembly is fully deployed the fixture is then removed as shown in FIG. 4.

Since the draw means comprises a shape memory alloy, the converging of the mandrels occurs by the axial contraction of the draw means in response to the metallurgical transformation of the shape memory alloy from the martensitic state to the austenitic state. This transformation, according to one preferred embodiment of the invention, will occur in ambient temperature. The import of this is that when the repair assembly is placed into position, the draw means will contract in response to the temperature of the working environment. This contraction occurs without any external force being applied. In other words, the contraction of the draw means will be self-actuating. The self-actuating of the draw means is important because it means that the repair sleeve assembly can be placed into position and, without more, will become fully deployed thereby expanding the sleeve. All that remains to be done will be to remove the fixture and the draw means. As shown in FIG. 3, the draw means will already have become disengaged from the repair sleeve assembly and will be resting on fixture surface 46.

The preferred embodiment of the invention will also include a ferrule 30 peripherally located with respect to and centrally of the draw means mandrel 10. As described previously, the ferrule will have a stepped outside diameter configuration suitable for nesting with the sleeve so that upon the converging of the mandrels, the ferrule will nest with the sleeve and subsequently expand outwardly in conjunction with the expansion of the sleeve.

In a most preferred embodiment of the invention the repair sleeve assembly will further comprise two expanding retention rings 36, 38 peripherally located with respect to the draw means 8 and distally located with respect to each of the mandrels, 12, 10 respectively. As is evident from viewing FIGS. 1 to 3, it can be seen that the mandrels will each initially engage the sleeve. Convergence of the mandrels inwardly of the sleeve will expand the sleeve outwardly. As the mandrels continue to move inwardly of the sleeve, and after the ends of the sleeve have been expanded, the retention means will become positioned adjacent to the expanded ends of the sleeve. By a mechanism to be discussed hereafter, the retention means will disengage from the sleeve and then expand outwardly until constrained by the expanded end of the sleeve.

It has been found that the retention rings are necessary to prevent springback of the expanded sleeve. This elastic springback will otherwise cause a gap between the expanded sleeve and the damaged pipe thereby allowing fluid to pass there between. The retention rings cause the expanded sleeve to remain in the fully expanded positon which will promote a leak-tight seal.

In one preferred embodiment, at least one of the retention means, most preferably retention means 38, is made of a shape memory alloy so that upon exposure to ambient temperatures it will actuate and expand without the application of any external force. In assisting with the sealing of the sleeve it is preferable that the sleeve has seal means such as circumferentially extending teeth 44.

In another embodiment of the repair sleeve assembly the assembly may comprise a draw means 8 having a conically shaped mandrel 10 at one end 42 and an opposed end 40. There will also be a collapsible conically shaped mandrel 12, two expanding retention means 36,38 and an annular repair sleeve 6. This repair sleeve assembly will function as follows. The repair sleeve assembly in a first position will have the collapsible mandrel peripherally located with respect to the draw means and proximate to the opposed end of the draw means. Also in this first position the repair sleeve assembly will have the retention rings peripherally located with respect to the draw means and distally located with respect to the mandrels.

In a second position the repair sleeve assembly will have the draw means contained within the sleeve with the retention rings and at least a portion of each of the mandrels protruding outside of the sleeve. The second position is as shown in FIG. 1, with the exception, of course, that the assembly would be outside of the damaged pipe.

The repair sleeve assembly in a third positon is now inserted within the damaged pipe as shown in FIG. 1 with one of the retention rings and at least a portion of the collapsible mandrel remaining outside of the damaged pipe.

The repair sleeve assembly in a fourth position will have the collapsible mandrel converged toward the draw means mandrel so that the mandrels are urged inwardly of the sleeve while simultaneously expanding opposed ends of the sleeve outwardly into engagement with the damaged pipe. This is clearly shown in FIG. 2.

In a fifth position, as also shown in FIG. 2, the repair sleeve assembly will have the retention rings expand outwardly into engagement with the now expanded ends of the sleeve.

As shown in FIGS. 3 and 4 the final step is the repair sleeve assembly in a sixth position having the draw means disengaged from the assembly. In FIG. 3, the draw means is merely resting on fixture surface 46. Upon removal of the fixture 45, as seen in FIG. 4, the draw means will drop down from the remainder of the assembly.

Other aspects of this embodiment of the invention which are apparent from the drawings and the previous embodiment but are not specifically discussed here are, nevertheless, included within the scope of the invention.

The functioning of another embodiment of the repair sleeve assembly can be described as follows. In this repair sleeve assembly, there is a draw means 8 having a conically shaped mandrel 10 at one end 42 and an opposed end 40. There is also a collapsible conically shaped mandrel 12 and an annular repair sleeve 6.

The repair sleeve assembly in a first position will have the collapsible mandrel 12 peripherally located with respect to the draw means 8 and proximate to the opposed end 40 of the draw means. In other words, the collapsible mandrel loosely encircles the draw means down near the opposed end 40 of the draw means.

The repair sleeve assembly in a second position will have the draw means contained within the sleeve with at least a portion of each of the mandrels 14 and 16 protruding outside the sleeve. The repair sleeve assembly is now ready for insertion into the damaged pipe.

In a third position, as shown in FIG. 1, the repair sleeve assembly in now inserted within the damaged pipe with at least a portion of the collapsible mandrel remaining outside of the damaged pipe.

The repair sleeve assembly in a fourth position will have the collapsible mandrel converge toward the draw means mandrel. Necessarily, the mandrels are urged inwardly of the sleeve. In this embodiment, however, the opposed ends of the sleeve, one end 20 first and then the other end 18, are expanded outwardly into engagement with the damaged pipe. This sequential expanding is achieved by designing the assembly so that less force is needed to urge the collapsible mandrel 12 inwardly and expand end 20 of the sleeve outwardly than is needed to urge draw means mandrel 10 inwardly and expand end 18 of the sleeve outwardly. The effect of this is important. When the collapsible mandrel 12 becomes fully engaged in expanded end 20 of the sleeve, further inward movement of the collapsible mandrel is prevented by means as discussed hereafter. Then the only way that the draw means mandrel can converge toward the collapsible mandrel is to move inwardly of the sleeve. When so moved inwardly of the sleeve, it will expand end 18 of the sleeve outwardly into its fully expanded position. Upon full expansion of end 18 of the sleeve, the draw means mandrel will have moved through the expanded end 18 of the sleeve as shown in FIG. 3. The assembly is sized so that the draw means mandrel can move past expanded end 20 of the sleeve without binding.

The repair sleeve assembly then in the fifth position has the draw means disengaged from the assembly.

The enlarged cross-sectional portion 26 assists in the sequential movement of the mandrels. When the collapsible mandrel 12 becomes fully engaged in the expanded end 20 of the sleeve, the enlarged portion 26 abuts end 28 of the damaged pipe. Thus further inward movement of the collapsible mandrel is prevented. It can be seen that the enlarged cross-sectional portion 26 acts as an anchor to pull the draw means mandrel 10 further inwardly of the expanded sleeve. In so doing it is assured that the draw means mandrel does in fact move through the sleeve and is not wedged in the sleeve or left up above the sleeve which would cause the repair sleeve assembly to effectively plug the tube rather than repair it.

Other aspects of this embodiment of the invention which are apparent from the drawings but not specifically discussed here are, nevertheless, included within the scope of the invention.

Referring now to FIGS. 5 through 8, and particularly referring to FIG. 5, there is illustrated in greater detail the operation of the retention means 38 of FIGS. 1 to 4. At this stage of the deployment of the invention, the draw means mandrel 10 has already expanded end 18 of the sleeve 6 and ferrule 30. The direction of movement of the draw means 8 is toward the bottom of the paper.

The next step is the positioning of retention means 38. As the draw means moves downwardly, shoulder 48 of the retention means abuts against end 50 of the ferrule and further downward movement of the retention means is prevented. However, the draw means continues to move downwardly.

As the draw means moves downwardly, surface 52 of the draw means moves against surface 54 of the retention means. While surface 52 can be formed integrally with the draw means, it can more economically be formed as a part of tube 53 which can then be threaded onto the draw means. Since surface 54 is initially bent inwardly, downward movement of surface 52 will cause surface 54 to be bent outwardly. In turn, surface 56 is moved outwardly to a second position 56', shown in dotted lines. Since the retention means abuts the ferrule on the top and is wrapped around the ferrule on the bottom, the retention means thus become locked into position around the ferrule.

If the retention means comprises a shape memory alloy, the retention means, after transformation from the martensitic state to the austenitic state, will attempt to expand outwardly against the ferrule and end 18 of the sleeve. The outwardly directed force resulting from the shape memory effect of the retention means is sufficient to prevent elastic springback of the ferrule and end 18 of the sleeve.

It should be noted that the ferrule serves a very useful purpose. Once the draw means mandrel moves past the now-expanded ferrule, there is no chance that the draw means mandrel can bind on the inside diameter of the sleeve. The ferrule thus provides a means to expand the end of the sleeve and also a clearance for the movement of the draw means mandrel.

It has been found that the invention can be more effectively deployed if the ends 18 and 20 of the sleeve are made thinner in cross-section then the remainder of the sleeve. The expansion of the ends of the sleeve, are, of course, more easily accomplished when this is the case.

Seal means 44 are more readily visible in FIG. 5. In conjunction with the expansion of the end of the sleeve, the circumferentially extending teeth bite into the damaged pipe. The result is a leak-tight seal.

Another embodiment of the retention means is illustrated in FIG. 6. As was the case with the previous embodiment of the retention means, the draw means mandrel 10 has moved past the ferrule 30 and end 18 of the sleeve. Downward movement of the draw means 8 causes shoulder 48 to abut end 50 of the ferrule.

In this embodiment, however, the retention means is held onto the draw means by collapsible spring 58 which sits in groove 60.

As the draw means continues to move downwardly, further movement downward of the retention means is impossible. Rather, the downward pull of the draw means and the resistance of the retention means is sufficient to cause collapsible spring 58 to collapse further into groove 60. Then, the draw means with the collapsed spring is able to move down through and past the retention means.

Again, if the retention means comprises a shape memory alloy, the outwardly directed force due to the recovery of the shape memory alloy will prevent elastic springback of the ferrule and end 18 of the sleeve.

FIG. 7 is a further embodiment of the retention means. This embodiment is similar to the FIG. 6 embodiment except frangible cap 62 holds the retention means onto the draw means. The frangible cap 62 may be made of any frangible material including but not limited to plastic.

After shoulder 48 of the retention means abuts end 50 of the ferrule, the draw means will continue to attempt to move downwardly. When the downward pull of the draw means is sufficient to overcome the strength of the frangible cap, the frangible cap will fracture 64 and become free of the draw means. Then the retention means will be released from the draw means and the draw means can continue its downward travel.

Again, if the retention means comprises a shape memory alloy, the outwardly directed force due to the recovery of the shape memory alloy will prevent elastic springback of the ferrule and the end 18 of the sleeve.

A still further embodiment of the retention means is illustrated in FIG. 8. In this embodiment, the ferrule is unnecessary.

There is a retention means cap 66 comprising a threaded connection to the draw means and retention means 38. In this case, downward movement of the draw means will cause shoulder 68 of the retention means cap to abut end 70 of the sleeve. Further downward movement of the draw means will, of course, be resisted by the retention means cap. However, when the downward pull of the draw means is sufficient to overcome the strength of the retention means cap, the retention means cap will fracture 72 and release the retention means. The retention means cap may include notches 74 to promote the fracturing of the retention means cap.

After the retention means is released, the draw means may continue downwardly unimpeded.

As with the previous embodiments of FIGS. 5 through 7, if the retention means cap and retention means comprise a shape memory alloy, the outwardly directed force due to the recovery of the shape memory alloy will prevent elastic springback of the end 18 of the sleeve.

Yet another embodiment of the retention means is illustrated in FIG. 9. In this embodiment also, the ferrule is unnecessary.

Any of the retention means of FIGS. 5 to 8 may be used with the embodiment of FIG. 9. In the embodiment shown, the retention means of FIG. 8 is used. In this embodiment downward movement of the draw means will cause the draw means mandrel 10 to directly expand the end 18 of the sleeve.

As the draw means continues downwardly, shoulder 68 of retention means 38 will abut end 70 of the sleeve. As described previously in connection with FIGS. 5 to 8, further downward movement of the draw means will cause the retention mean to become disengaged from the draw means.

In order to provide clearance for the continued downward movement of the draw means mandrel, the sleeve is undercut just below seal means 44.

As before stated, if the retention means comprises a shape-memory alloy, the outwardly directed force due to the recovery of the shape-memory alloy will prevent elastic springback of the end 18 of the sleeve.

A further embodiment of the retention means in which the ferrule is unnecessary is illustrated in FIG. 10.

Again, as the draw means continues downwardly, shoulder 68 of retention means 38 will abut end 70 of the sleeve. As described previously in connection with FIGS. 5 to 9, further downward movement of the draw means mandrel 10 will cause the retention means to become disengaged from the draw means.

In this embodiment, however, there is a two-step expansion of the sleeve. The first step in the expansion is when the retention means and the mandrel, together, enter end 18 of the sleeve to partially expand tne sleeve end outwardly. The second step in the expansion occurs after the retention means shoulder abuts the end of the sleeve. In the second step, the further downward movement of the draw means mandrel causes the retention means to expand outwardly and the sleeve end to expand further outwardly. The second step expansion is aided by the movement of the draw means mandrel conical surface 72 against retention means conical surface 74.

Once the draw means mandrel passes the retention means on its downward movement, there will be ample clearance between the draw means mandrel and the sleeve.

Again, if the retention means comprises a shape-memory alloy, the outwardly directed force due to the recovery of the shape-memory alloy will prevent elastic springback of the end 18 of the sleeve.

An important advantage of this embodiment is that when a shape-memory alloy retention means is utilized, the stress applied after recovery of the shape memory alloy will be constant, regardless of the tolerance of the inside diameter of the tube. Thus, the optimum stress can be determined that will be sufficient for sealing purposes but will be insufficient to initiate stress corrosion cracking of the sleeve and tube.

It should be noted that in this embodiment, sealing means on the sleeve outside diameter are not necessary.

Also disclosed according to the invention is a method of repairing a damaged pipe. In one embodiment of the method there is utilized a repair apparatus assembly comprising a shape memory alloy draw means 8 having expanding means 10, 12 on either end and a repair sleeve 6. The draw means is contained within the sleeve with at least a portion of each of the expanding means protruding outside of the sleeve. Now, according to the method, the repair apparatus assembly is cryogenically cooled. It should be understood that "cryogenically cooled" means that the entire repair apparatus assembly is immersed for a sufficient period of time in liquid nitrogen. This step is necessary to transform the shape memory alloy into the martensitic condition.

The next step is the inserting of the repair apparatus assembly in the damaged pipe followed by warming the repair apparatus assembly. Warming is, of course, necessary to activate the shape memory effect which arises from the transformation of the shape memory alloy from the martensitic state to the austenitic state.

A further step is converging the expanded means without the application of external mechanical means. This step is an integral part of the self-actuation of the mechanism.

The method further comprises engaging the expanding means with the ends of the sleeve. As the expanding means continue to move or continue to converge and the degree of engagement with the ends of the sleeve increases, the ends of the sleeve become expanded outwardly into engagement with the damaged pipe.

The final step of the method is removing the draw means. At this point, the sleeve is fully installed and a leak-tight seal is obtained. Thus the damaged pipe is repaired by the method of this invention.

It is preferred that the step of warming comprises exposing the repair apparatus assembly to the ambient temperature.

In an alternative embodiment of the method, according to the invention, the step of cryogenically cooling may not be necessary. In this embodiment, shape-memory alloys can be used that have a higher martensite transformation temperature such that cooling in liquid nitrogen is unnecessary. However, since it may be a requirement of these alloys that they not be martensitic after installation at or near ambient temperature, it will nevertheless be necessary to cool certain of these alloys in some medium such as cooled alcohol in order to promote the martensitic transformation but this step of cooling may be accomplished at the time of manufacture instead of prior to installation. Simultaneously, these same shape-memory alloys can have either a permanent or temporary austenite transformation temperature above ambient temperature, as will become apparent hereafter. The step of warming, then, in this embodiment requires warming to a temperature above ambient temperature.

It is also preferred that the step of expanding the ends of the sleeve comprises fully expanding one end of the sleeve and then fully expanding the other end of the sleeve in sequence.

Finally, the repair apparatus assembly further comprises two retention rings peripherally located with respect to the draw means and distally located with respect to the expanding means. The importance to the method of the addition of the two retention means will become apparent. The method now comprises positioning the retention rings adjacent the expanded ends of the sleeve and then expanding the rings, thereby locking the expanded ends of the sleeve in the fully expanded position by the subsequent expansion of the retention rings. The retention rings prevent elastic springback of the expanded ends of the sleeve, which would lead to a gap between the sleeve and the damaged pipe, i.e., a leak.

In a most preferred embodiment of the invention, at least one of the retention rings comprises a shape memory alloy and the step of expanding the rings comprises exposing the rings to ambient temperature. By exposing the rings to ambient temperature this step, as with the previous step of warming the apparatus, ensures that that the entire repair sleeve assembly will be self-actuating. Exposing the parts in the martensitic state to ambient temperature promotes the shape memory effect transformation from the martensitic state to the austenitic state at the temperature of the working environment.

In the alternative embodiment of this method, when at least one of the retention rings comprises a shape memory alloy the step of expanding the rings comprises exposing the ring or rings to a temperature above ambient temperature.

Finally the step of removing the draw means includes removing at least one expanding means also, as shown in FIG. 3.

In another embodiment of the method there is utilized a repair apparatus assembly comprising a draw means 8 and expanding means 10 and 12 on either end. There are two retention rings 36, 38 peripherally located with respect to the draw means and distally located with respect to the expanding means. There is also a repair sleeve 6. The draw means is contained within the sleeve with the retention rings and at least a portion of each of the expanding means protruding outside of the sleeve. With this apparatus in mind, the method comprises firstly assembling the repair apparatus assembly and then inserting the repair apparatus assembly into the damaged pipe.

Continuing, the method further comprises converging the expanding means and retention rings, respectively, and then expanding the ends of the sleeve outwardly into engagement with the damaged pipe.

The next step is positioning the retention rings adjacent the expanded ends of the sleeve. After the retention rings have been properly positioned then the next step is expanding the retention rings.

The method further comprises locking the expanding ends of the sleeve into the fully expanded position by this subsequent expansion of the retention rings.

The final step of the method is removing the draw means.

It is preferable in one embodiment of the invention that at least one of the retention rings comprises a shape memory alloy and the step of expanding the retention rings comprises exposing the retention rings to ambient temperature. In this way, the locking function of the retention rings becomes self-actuating.

It is preferable in an alternative embodiment of the invention that when at least one of the retention rings comprises a shape memory alloy having higher martensite and austenite transformation temperatures, as discussed above, then the step of expanding the retention rings comprises exposing the retention ring or rings to a temperature above ambient temperature.

It is also preferred that the step of expanding the ends of the sleeve comprises fully expanding one end of the sleeve and then fully expanding the other end of the sleeve in sequence. It is also preferable that the step of removing the draw means includes removing at least one expanding means also. In other words, when the draw means 8 is removed, draw means mandrel 10 will be removed also.

In the final embodiment of the invention, there is utilized a repair apparatus assembly comprising a draw means 8 having expanding means 10,12 on either end and a repair sleeve 6. The draw means is contained within the sleeve with at least a portion of each of the expanding means protruding outside of the sleeve. The method now comprises assembling this repair apparatus assembly and then inserting the repair apparatus assembly into the damaged pipe.

The next steps of the method are converging the expanding means and then engaging the expanding means with the ends of the sleeve.

The method further comprises fully expanding one end of the sleeve outwardly into engagement with the damaged pipe and then fully expanding the other end of the sleeve outwardly into engagement with the damaged pipe. That is, the ends of the sleeve are expanded outwardly sequentially.

The final step of the method is removing the draw means.

It is preferred that the step of removing the draw means includes removing at least one expanding means also. That is when the draw means 8 is removed, the draw means mandrel 10 is preferably removed also.

Throughout the specification, the use of shape-memory alloys for the draw means and retention means has been described. Many of the well-known shape-memory alloys already known to those skilled in the art are suitable for use with the instant invention. However, a particularly preferred alloy for the draw means is the nickel/titanium/iron alloy disclosed in the Harrison et al. U.S. Pat. No. 3,753,700, which is hereby incorporated by reference. It is preferred that this alloy be processed according to the co-pending U.S. patent application Ser. No. 596,771 filed even date herewith, which is hereby incorporated by reference.

A preferred alloy for the retention means is the nickel/titanium/vanadium alloy disclosed in U.S. patent application Ser. No. 541,844 processed according to U.S. patent application Ser. No. 553,005 both of which are hereby incorporated by reference.

An important point to mention here, a point already apparent to those skilled in the art, is that many of the alloys suitable for use with the instant invention including the above iron and vanadium alloys have an $M_s$ temperature below ambient temperature. Thus, when the instant invention calls for a shape-memory alloy, it is understood that the part embodying that shape-memory alloy must be cooled prior to installation to some temperature below the $M_s$ temperature in order to transform that part into the martensitic condition. Cooling the part individually should be satisfactory. However, it has been found that when the draw means comprises shape-memory alloys, cooling of the whole repair sleeve assembly is preferred. It is also preferred that cooling be by immersion in liquid nitrogen. This step has been alluded to in the description of a preferred embodiment of the method of the invention.

In order to effectuate the objects of the invention, the $M_s$ temperature of the retention means should be greater than the $M_s$ temperature of the draws. This insures that the draw means will transform first from the martensitic state to the austenitic state and cause the expansion of the sleeve prior to the expansion of the retention means. If the reverse occurred, the whole apparatus will lock up and effectively plug the tube.

In another aspect of the invention, shape-memory alloys may be used for the draw means and the retention means which have an $A_s$ temperature above ambient such that the shape-memory alloy has to be heated to effect the transformation from the martensitic state to the austenitic state. When this is the case, suitable heating means may be provided. For example, if a hollow draw means were to be utilized, then a suitable heat source may be inserted within the draw means to supply the heat necessary to effect the transformation. Or, if the draw means was solid, then a suitable heat source may be wrapped around the draw means.

In this aspect of the invention, the objects of the invention will be best achieved when the $A_s$ temperature of the retention means is higher than the $A_s$ temperature of the draw means. So that the retention means retains its strength after being installed, it should remain in the austenitic condition. This being the case, the $M_s$ temperature of the retention means should be below ambient temperature. On the other hand, since the draw means is removed from the assembly after installation, its $M_s$ temperature is not so critical and may, in fact, be above room temperature.

It can be appreciated that since these shape-memory alloys have an $A_s$ temperature above ambient temperature, no on-site cooling prior to installation is required. Thus, the apparatus may be fabricated and assembled at the point of manufacture and then shipped to the place of installation while in the martensitic condition. Once the apparatus has been carefully positioned in its intended environment, heat is applied to effect the transformation to austenite.

Suitable alloys for the retention means include the above-noted nickel/titanium/vanadium alloy as well as the nickel/titanium/niobium shape-memory alloy disclosed in U.S. patent application Ser. No. 688,777, filed Nov. 6, 1984, which is hereby incorporated by reference. To achieve the desired $A_s$ temperature, either of these shape-memory alloys may be processed according to U.S. Pat. No. 4,631,094, Simpson et al., which is hereby incorporated by reference. Suitable alloys for the draw means include the above-noted nickel/titanium/niobium alloys.

It will be obvious to those skilled in the art, having regard to this disclosure, that modifications of this invention, beyond those embodiments specifically described here, may be made without departing from the spirit of this invention. Accordingly, such modifications are considered to be within the scope of this invention as limited solely by the accompanying claims.

I claim:

1. A method of repairing a damaged pipe, comprising the steps of:
    assembling a repair apparatus assembly comprising a draw rod having an expanding means on each end thereof and a repair sleeve having two ends, the draw rod being contained within the sleeve with at least a portion of each of the expanding means protruding outside of the sleeve;
    inserting the repair apparatus in the damaged pipe;
    axially moving the expanding means towards one another, thereby engaging the expanding means with the ends of the sleeve;
    further axially moving one expanding means toward the other expanding means while maintaining the other expanding means stationary, stopping movement of the one expanding means, then after the one expanding means stops moving, further axially moving the other expanding means toward the one expanding means while maintaining the one expanding means stationary, thereby fully expanding one end of the sleeve outwardly into engagement with the damaged pipe and then fully expanding the other end of the sleeve outwardly into engagement with the damaged pipe; and
    physically removing the draw rod.

2. The method of claim 1 wherein the step of removing the draw rod includes removing at least one expanding means also.

3. A method of repairing a damaged pipe, comprising the steps of:
    providing a repair apparatus assembly comprising a shape-memory alloy draw rod having an expanding means on each end thereof and a repair sleeve haivng two ends, the draw rod being contained within the sleeve with at least a portion of each of the expanding means protruding outside of the sleeve;

inserting the repair apparatus assembly in the damaged pipe;

warming the repair apparatus assembly, thereby axially moving the expanding means toward one another without the application of external mechanical means, thereby engaging the expanding means with the ends of the sleeve, and thereby fully expanding the ends of the sleeve outwardly into engagement with the damaged pipe; and physically removing the draw rod.

4. The method of claim 3 wherein the step of warming comprises exposing the repair apparatus assembly to a temperature above ambient temperature.

5. The method of claim 3 further comprising the step of cryogenically cooling the repair apparatus assembly just prior to inserting the repair apparatus assembly in the damaged pipe.

6. The method of claim 5 wherein the step of warming comprises exposing the repair apparatus assembly to ambient temperature.

7. The method of claim 5 including providing the repair apparatus with two retention rings peripherally located with respect to said draw rod and distally located with respect to said expanding means such that one retention ring is positioned at one end of the draw rod and the other retention ring is positioned at the other end of the draw rod and wherein the method further comprises:

positioning the retention rings adjacent the expanded ends of the sleeve; and subsequently expanding the rings, thereby locking the expanded ends of the sleeve in the fully expanded position.

8. The method of claim 7 wherein at least one of the retention rings comprises a shape-memory alloy and the step of expanding the rings comprises exposing the rings to ambient temperature.

9. The method of claim 2 wherein the step of expanding the ends of the sleeve comprises fully expanding one end of the sleeve and then fully expanding the other end of the sleeve.

10. The method of claim 3 including providing the repair apparatus with two retention rings peripherally located with respect to said draw rod and distally located with respect to said expanding means such that one retention ring is positioned at one end of the draw rod and the other retention ring is positioned at the other end of the draw rod and wherein the method further comprises:

positioning the retention rings adjacent the expanded ends of the sleeve; and subsequently expanding the rings, thereby locking the expanded ends of the sleeve in the fully expanded position.

11. The method of claim 8 wherein at least one of the retention rings comprises a shape-memory alloy and the step of expanding the rings comprises exposing the rings to a temperature above ambient temperature.

12. The method of claim 3 wherein the step of removing the draw rod includes removing at least one expanding means.

13. A method of repairing a damaged pipe, comprising the steps of:

assembling a repair assembly comprising a draw rod having expanding means on each end thereof; two retention rings peripherally located with respect to the draw rod and distally located with respect to the expanding means such that one retention ring is at one end of the draw rod and the other retention ring is at the other end of the draw rod; and a repair sleeve having two ends; the draw rod contained within the sleeve with the retention rings and at least a portion of each of the expanding means protruding outside of the sleeve;

inserting the repair apparatus assembly in the damaged pipe;

axially moving one expanding means and one retention ring toward the other expanding means and the other retention ring while axially moving the other expanding means and the other retention ring toward the one expanding means and the one retention ring;

further axially moving one expanding means and one retention ring toward the other expanding means and the other retention ring while maintaining the other expanding means and the other retention ring stationary, stopping movement of the one expanding means and the one retention ring, then after the one expanding means and the one retention ring stops moving, further axially moving the other expanding means and the other retention ring toward the one expanding means and the one retention ring while maintaining the one expanding means and the one retention ring stationary, thereby fully expanding the ends of the sleeve outwardly into engagement with the damaged pipe, and thereby positioning the retention rings adjacent the fully expanded ends of the sleeve;

subsequently expanding the rings, thereby locking the expanded ends of the sleeve in the fully expanded position; and physically removing the draw rod.

14. The method of claim 13 wherein at least one of the retention rings comprises a shape-memory alloy and the step of expanding the retention rings comprises exposing the retention rings to a temperature above ambient temperature.

15. The method of claim 13 wherein at least one of the retention rings comprises a shape-memory alloy and the step of expanding the retention rings comprises exposing the retention rings to ambient temperature.

16. The method of claim 13 wherein the step of expanding the ends of the sleeve comprises fully expanding one end of the sleeve and then fully expanding the other end of the sleeve.

17. The method of claim 13 wherein the step of removing the draw rod includes removing at least one expanding means.

18. A method of repairing as damaged pipe, comprising the steps of:

cryogenically cooling a repair apparatus assembly comprising a shape-memory alloy draw rod having expanding means on each end thereof and a repair sleeve having two ends, the draw rod being contained within the sleeve with at least a portion of each of the expanding means protruding outside of the sleeve;

inserting the repair apparatus assembly in the damaged pipe;

warming the repair apparatus assembly, thereby axially moving the expanding means toward one another without the application of external mechanical means, thereby engaging the expanding means with the ends of the sleeve, and thereby fully expanding the ends of the sleeve outwardly into engagement with the damaged pipe; and physically removing the draw rod.

19. The method of claim 18 wherein the step of warming comprises exposing the repair apparatus assembly to ambient temperature.

20. The method of claim 18 wherein the step of expanding the ends of the sleeve comprises fully expanding one end of the sleeve and then fully expanding the other end of the sleeve.

21. The method of claim 18
including providing the repair apparatus with two retention rings peripherally located with respect to said draw rod and distally located with respect to said expanding means such that one retention ring is at one end of the draw rod and the other retention ring is at the other end of the draw rod and wherein the method further comprises:

positioning the retention rings adjacent the fully expanded ends of the sleeve; and subsequently expanding the rings, thereby locking the expanded ends of the sleeve in the fully expanded position 22. The method of claim 21 wherein at least one of the retention rings comprises a shape-memory alloy and the step of expanding the rings comprises exposing the rings to ambient temperature.

23. The method of claim 18 wherein the step of removing the draw rod includes removing at least one expanding means.

* * * * *